May 15, 1923.
L. RUDOLPH
SAFETY CRANK
Filed Aug. 7, 1922
1,455,226
3 Sheets-Sheet 1
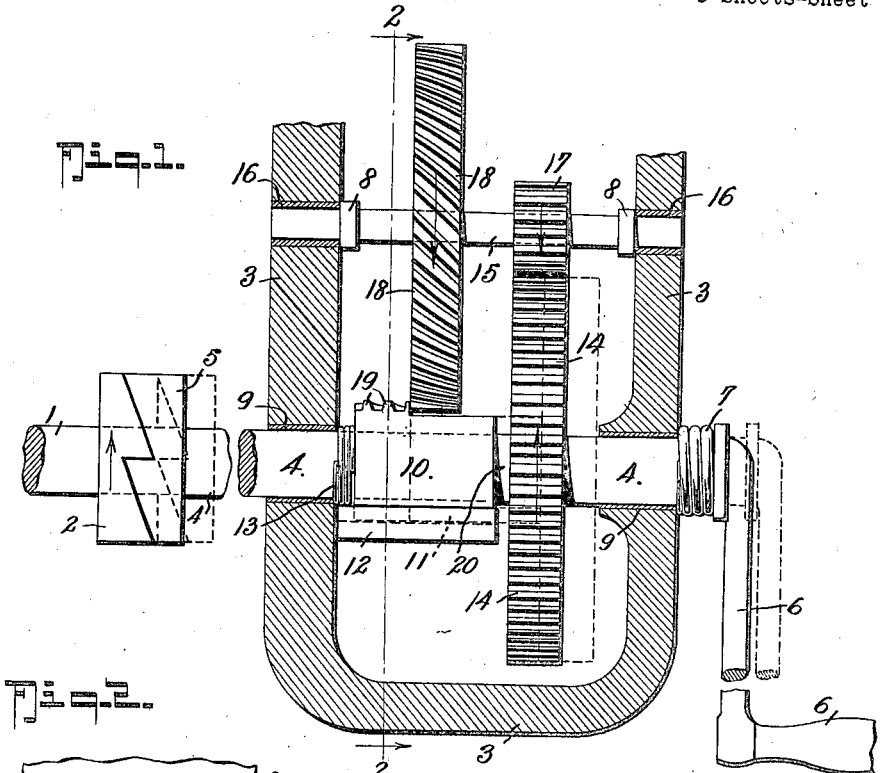
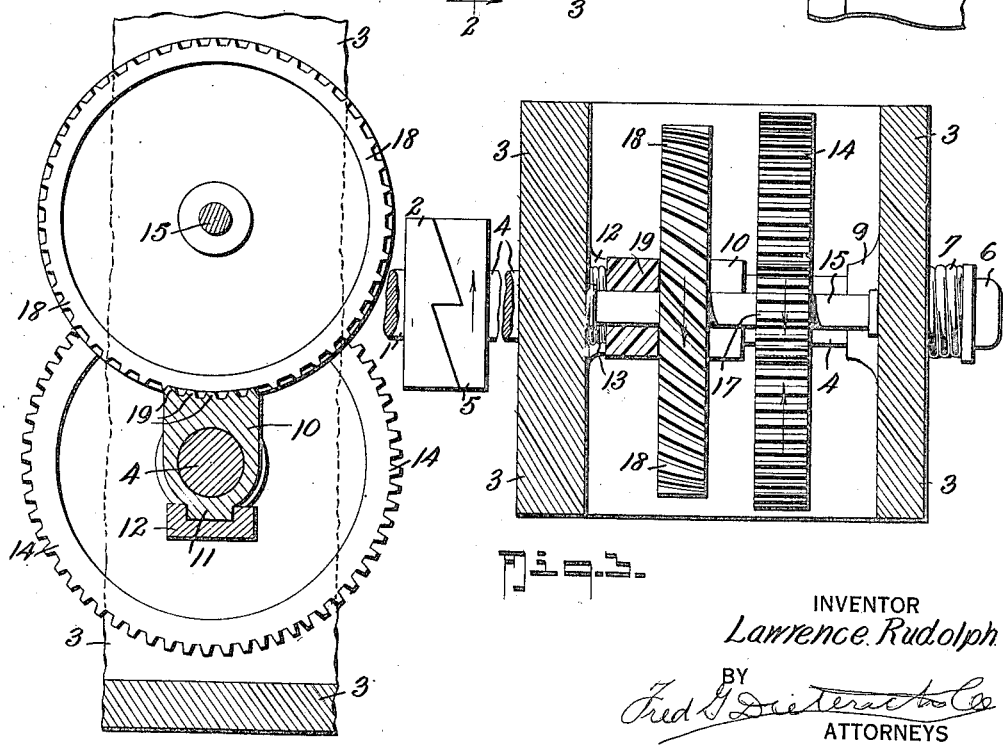
INVENTOR
Lawrence Rudolph
BY
Fred G Dieterich & Co
ATTORNEYS May 15, 1923.
L. RUDOLPH
SAFETY CRANK
Filed Aug. 7, 1922
1,455,226
3 Sheets-Sheet 2
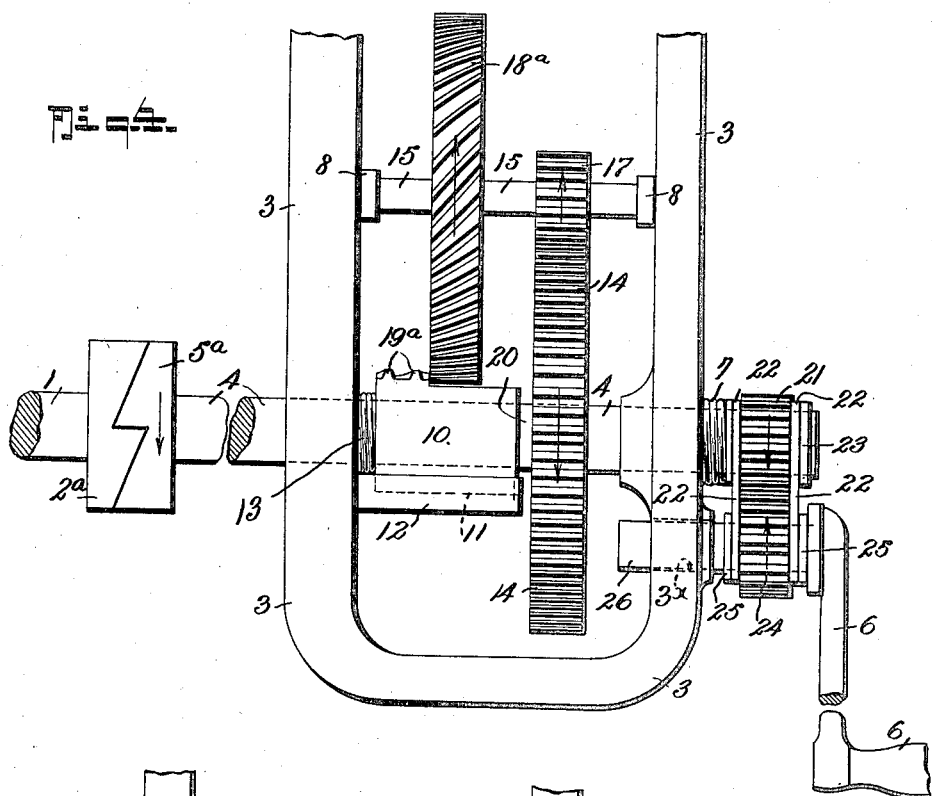
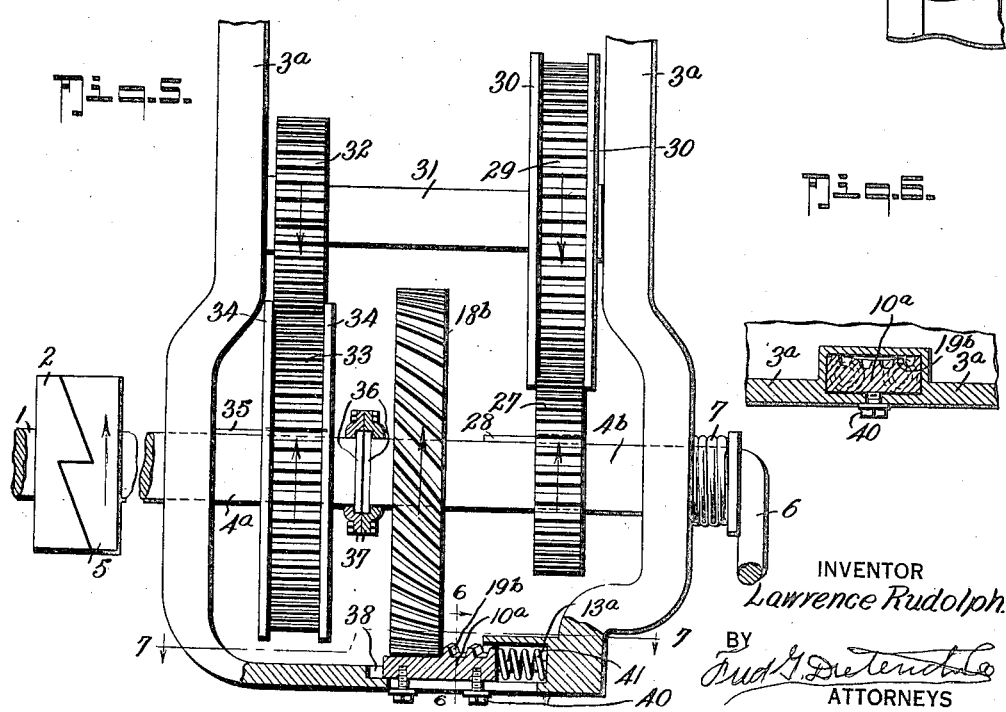
INVENTOR
Lawrence Rudolph.
BY
ATTORNEYS

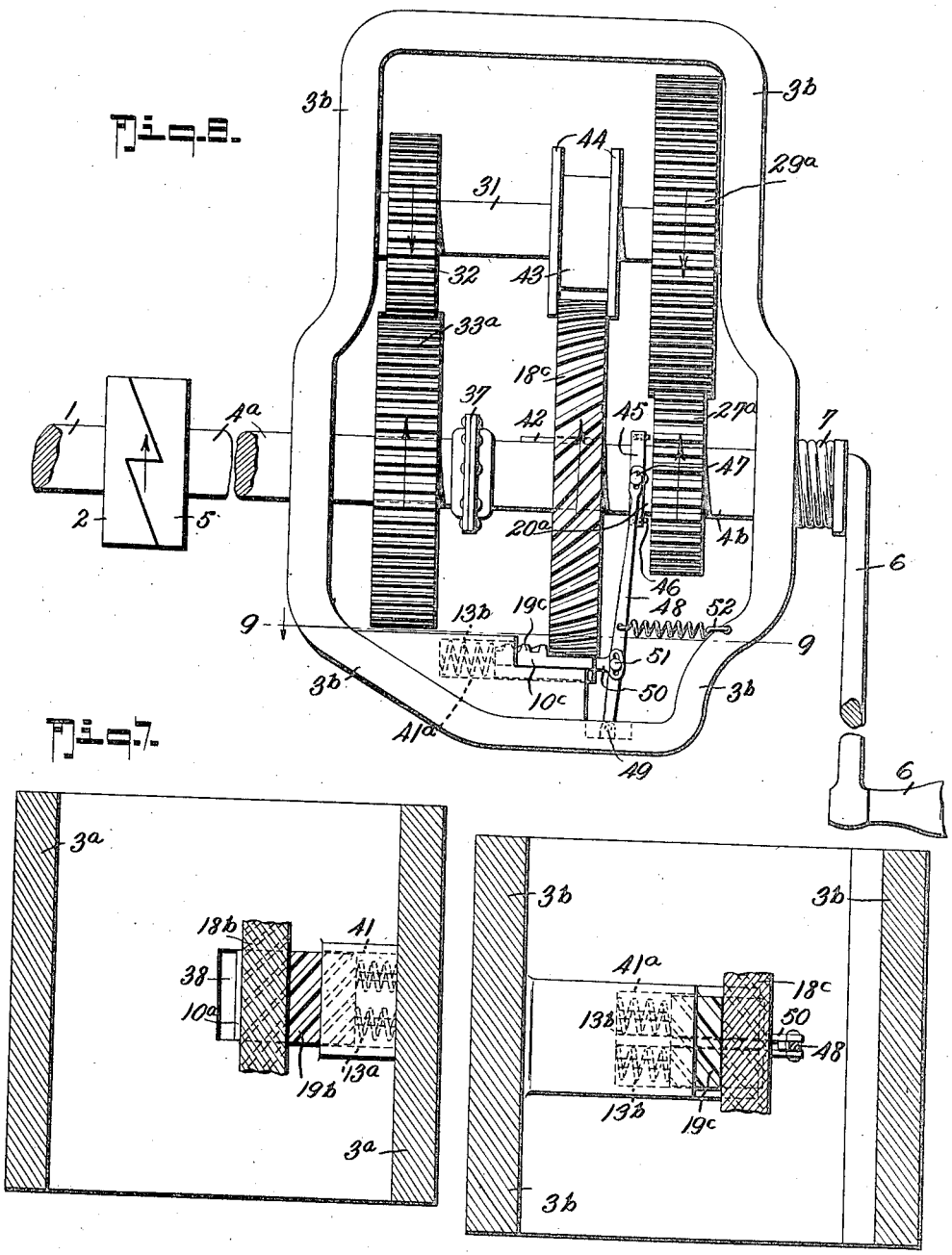

Patented May 15, 1923.

1,455,226

UNITED STATES PATENT OFFICE.

LAWRENCE RUDOLPH, OF LOUISVILLE, KENTUCKY, ASSIGNOR TO RUDY RUDOLPH, OF PENSACOLA, FLORIDA.

SAFETY CRANK.

Application filed August 7, 1922. Serial No. 580,367.

*To all whom it may concern:*

Be it known that I, LAWRENCE RUDOLPH, a citizen of the United States, residing at Louisville, in the county of Jefferson and State of Kentucky, have invented certain new and useful Improvements in Safety Cranks, of which the following is a specification.

This invention relates to a certain new and useful safety crank for internal combustion engines, especially those employed in motor vehicles, motor boats, and aerial navigating machines. The invention primarily has for its object to provide a device of the nature stated, in which provision is made to insure a quick uncoupling of the cranking shaft from the engine shaft in the event of a "kick back" and thus avoid injuring the operator; another object is to provide a cranking mechanism with reduction gearing so as to render cranking easier; again it is an object to simplify the construction of devices of this general character by reducing the number of parts necessary to the proper operation of the apparatus and yet have those parts which are retained constructed in a staunch manner so that the apparatus will last the life time of the engine with which it is employed.

In its general nature, the invention comprises a cranking shaft with a clutch element that is adapted to be pushed into engagement with a mating clutch element on the engine shaft by the simple act of cranking in the usual way, but which will be quickly withdrawn from connection with the engine shaft, if the engine "kicks back" or back fires, without turning the crankshaft reversely except for a few degrees.

In its more detailed nature, the invention comprises a cranking shaft which carries the clutch element for engaging the engine shaft clutch element, such cranking shaft being not only rotatable around its axis but movable longitudinally along the same, and a countershaft, with spiral gear, driven from the cranking shaft by a train of gearing and adapted to engage with the spiral teeth of a thrust or sliding block to force it quickly along a direction parallel with the axis of the cranking shaft and thereby cause it to engage a fixed abutment (one of the gears of the gear train for example) on the cranking shaft and force it out of connection with the engine shaft, a crank serving to give normal motion to the cranking shaft either through direct connection therewith or through a gear train.

In the accompanying drawings I have illustrated several embodiments of my invention, showing the adaptation of the same to both left and right hand engines and for both left and right hand cranking, and by reference to the drawings it will be seen that Figure 1 is a sectional side view of one embodiment of the invention adapted for engines of the usual kind which run in a right handed or clockwise direction (when facing them from the front), the cranking motion being in the same direction; the full line arrows indicating the direction of rotation of the several parts when cranking.

Figure 2 is a cross section on the line 2—2 of Figure 1.

Figure 3 is a plan view of the parts shown in Figure 1 with the supporting walls in section.

Figure 4 is a modification of the structure shown in Figure 1, adapted to left hand motors.

Figure 5 is an elevation and part section of another embodiment of the invention.

Figure 6 is a detail section on the line 6—6 of Figure 5.

Figure 7 is a detail horizontal section on the line 7—7 of Figure 5.

Figure 8 is an elevation of still another embodiment.

Figure 9 is a detail section on the line 9—9 of Figure 8.

In the drawings like numerals indicate like parts in all of the figures and those bearing the index letters *a* and *b* represent parts corresponding with other figures having the same principal number but differing in structural details.

Referring especially to the embodiments of the invention illustrated in Figures 1 to 4, inclusive, it will be seen that 1 designates the engine shaft and 2 its clutch member with which the clutch member 5 on the cranking shaft 4 is designed to engage.

The cranking shaft 4 is journaled in suitable bearings 9 in a suitable frame or support 3 which is adapted to be bolted or otherwise secured in suitable position on the machine on which the engine is mounted (automobile, aeroplane, tractor or other similar vehicle). The cranking shaft 4 has motion imparted to it through the medium of a crank 6, a throw out spring 7 being provided to normally hold the clutch element 5 disconnected from the element 2 (see dotted lines Figure 1).

10 designates a sliding block which is mounted on the shaft 4 in the embodiment of the invention referred to, so that the shaft 4 may turn freely in the block 10 and the block 10 may be moved along the shaft under the influence of a light spring 13 or be moved in the opposite direction by the action of the gear 18 on the teeth 19 of the block during the cranking movement, as will be later explained.

The block 10 has a projection 11 which rides in a guideway in a bracket 12 so as to hold the block 10 against turning on the shaft 4. 14 is a spur gear fixed to the shaft 4 and meshing with a spur gear 17 on a countershaft 15 which is journaled in suitable bearings 16 and held against longitudinal motion by suitable collars 8.

18 is a spiral gear secured to the shaft 15 in any suitable way and is adapted to mesh with the teeth 19 of the sliding block 10 at times.

In the embodiment shown in Figures 1, 2 and 3, inclusive, when it is desired to crank the engine the operator takes hold of the crank 6, pushes it in to bring the clutch members 5 and 2 into engagement and turns the crank in a right handed or clockwise direction. Motion is thus imparted to the shaft 4 to turn the gears 14, 17 and 18 in the direction of the full line arrows, which causes the shaft 1 to be turned in the same direction as the shaft 4 and also by reason of the pitch of the teeth 18 and 19, the turning of the gear 18 in the direction of the arrow will cause the sliding block 10 to move in the direction from right to left in Figure 1 until it assumes a position with the teeth 19 out of mesh with the gear 18, so that the gear 18 will be free to turn in the direction of the arrow. The instant a "kick back" occurs and the shaft 1 starts to turn backwards, its motion will be imparted to the shaft 4, which will start to turn the gears 14, 17 and 18 in a direction opposite to the arrows. The instant this occurs, the teeth 19 will mesh with the teeth 18 and as they are of quick pitch, the sliding block 10 will be moved quickly from left to right in Figure 1 until it assumes the dotted line position of Figure 1. As soon as the shaft 4 is started backwards by the "kick back" of the engine, the sliding block 10 will have its gear teeth 19 brought into mesh with the gear 18 and in order to allow the teeth to become well meshed before the sliding block 10 engages the gear 14 to push the shaft 4 from left to right in Figure 1 and disengage the clutch elements, I provide a space 20 between the block 10 and gear 14, when the parts are in the normal cranking position shown in full lines in Figure 1.

In the embodiment of the invention shown in Figure 4 (which is a modification of that shown in Figure 1), the same is adapted for a left hand rotating engine; that is to say an engine in which the cranking shaft turns in a counterclockwise direction. In this embodiment, in order that the cranking may be done right handed, the crank 6 is provided with a short shaft 26 that operates in a suitable bearing 3$^x$ in the frame 3 and has a spur gear 24 which meshes with a spur gear 21 on the cranking shaft 4, there being connecting plates 22 provided with bearing apertures for the shafts 4 and 26, the plates 22 being held against axial movement on the shafts by suitable collars 25 and 23 secured in any desired way to the respective shafts 26 and 4. Thus as the operator starts to crank the engine, he pushes in on the crank 6 and begins turning it in a clockwise direction which imparts, through the gears 24 and 21, a counterclockwise rotation to the shaft 4, the motion of which will be imparted through gears 14 and 17 to the spiral gear 18$^a$, the teeth of which are pitched oppositely to that of the spiral gear 18 in Figure 1, as are also the teeth 19$^a$ pitched oppositely to the teeth 19 of the form of the invention shown in Figure 1, thereby enabling the gear 18$^a$ to move the sliding block 10 from right to left in Figure 4 during the cranking operation. When a "kick back" occurs, the teeth 19$^a$ will be quickly meshed with the teeth 18$^a$ and the shaft 4 moved from left to right by engagement of the sliding block 10 with the gear 14 as before, taking with it the shaft 26 since both the shafts 4 and 26 are arranged to move longitudinally together through the medium of the plates 22 and collars 23 and 25 lying against the gears 21 and 24.

In Figure 5 is shown a further embodiment of the invention by reference to which it will be seen that the cranking shaft is made in two parts, 4$^a$—4$^b$, lying in axial alignment and flanged at 36, at which place they are secured to move axially by a suitable coupling 37 though they may have independent rotation. In this embodiment of the invention, the shaft 4$^b$ is provided with a sliding gear 27 keyed at 28 to turn with the shaft 4$^b$, the gear 27 meshing with a gear 29 on the countershaft 31, which is journaled in suitable bearings in the frame 3$^a$ and which carries another spur gear 32 to mesh with a spur gear 33 on the cranking shaft section 4$^a$. The gear 33 is also a sliding gear, being keyed to the shaft 4$^a$ by a key 35 so as to turn with the shaft. The gears 27 and 33 may be held in alignment with their countershaft gears 29 and 32 by flanges 30 and 34, as shown, so that when the shaft $4^a$—$4^b$ is endwise moved, the gears 27 and 33 will remain in position in mesh with the gears 29 and 32, respectively. The spiral gear $18^b$ is fixedly mounted on the cranking shaft section $4^b$ so as to move, in all directions, with it. In this embodiment of the invention, the sliding block $10^a$ operates in a channel 41 of the frame $3^a$ and has teeth $19^b$ to mesh with the teeth of the spiral gear $18^b$ at times. The block $10^a$ is thrust toward the spiral gear by light coil springs $13^a$ and it may be held in place by suitable screw and slot connections 40 with the frame $3^a$. The guideway for the block is elongated toward the left in Figure 5, as at 38, for a slight distance so as to allow the block $10^a$ to be moved a slight distance to bring the gear teeth $19^b$ and $18^b$ into good mesh before the strain of thrusting the shaft $4^a$—$4^b$ outwardly occurs. This space 38 functions similarly to the space 20 in the preceding embodiments of the invention. In operation, in order to crank the engine with the embodiment of the invention shown in Figure 5, the operator pushes the crank in, as shown in full lines in Figure 5, until the clutch members 5 and 2 are in engagement. He then turns the crank 6 in a clockwise direction, which imparts motion to the several gears in the direction of the arrows. If the engine "kicks back," a reverse motion is imparted to the shaft section $4^a$—$4^b$, which causes the gears to turn in directions opposite to their arrows with the result that the teeth $19^b$ of the sliding block $10^a$ will be meshed with the teeth of the spiral gear $18^b$ and as soon as the teeth of the block $10^a$ have moved a distance sufficient to take up the space 38, the gear $18^b$ will move to the right in Figure 5, carrying with it the shaft sections $4^a$—$4^b$ and disengaging the clutch elements 5 and 2. It will be noted that in this embodiment of the invention, the shaft $4^a$ is driven from the shaft $4^b$ through a gear train 27—29—32—33.

Another embodiment of the invention is illustrated in Figure 8, which embodiment is a modification of that shown in Figure 5. By referring to Figure 8, it will be observed that the spiral gear $18^c$ instead of being fixedly secured to the shaft section $4^b$ is slidably secured thereto by a key 42 and the sliding block $10^c$ operates a lever 48 which is fulcrumed at 49 and is connected with the sliding block by an extension 50 having a pin and slot connection 51 with the lever 48. The lever 48 has a pin and slot connection 47 with a collar 45 that is slidable on the shaft section $4^b$ and has rollers 46 whereby, when the rollers are in engagement with the gear $27^a$, the gear $27^a$ will be thrust laterally toward the right in Figure 8. In this modification of the invention, the gear $27^a$ is fixedly secured to the shaft section $4^b$ and the gear $33^a$ is fixedly secured to the shaft section $4^a$ so that when the collar 45 is thrust against the gear $27^a$, the shaft sections $4^b$—$4^a$ and gears $27^a$—$33^a$ will be bodily moved from left to right in Figure 9 to effect a disengagement of the clutch. In order to hold the gear $18^c$ against lateral motion, a flanged body 43 may be secured to the shaft 31, the flanges 44 of which embrace the gear $18^c$, or any other suitable means may be provided for keeping the gear $18^c$ from moving laterally. In the embodiment shown in Figure 8, should a "kick back" occur, the teeth $19^c$ of the sliding block $10^c$ will mesh with the teeth of the spiral gear $18^c$, thereby causing the lever 48 to be moved toward the right. It will be observed that in the normal position of the parts (see full lines Figure 8) a space $20^a$ is left so as to enable a slight lost motion which provides for the teeth $19^c$ engaging the teeth of the spiral gear $18^c$ before the thrust strains come upon the parts. In addition to the springs $13^b$, or in lieu thereof, I may provide pull springs 52, as shown in Figure 8.

From the foregoing description, taken in connection with the accompanying drawings, it is believed the construction, operation and advantages of my invention will be clear to those skilled in the art to which it appertains.

What I claim is:

1. In apparatus of the kind described, the combination with the cranking shaft having a clutch element for engaging a similar clutch element on an engine shaft, when said cranking shaft is thrown inwardly; means continuously tending to withdraw said cranking shaft from the engine shaft, and means augmenting said last named means to instantly thrust said cranking shaft back out of connection with the engine shaft upon a "kick back" of the engine.

2. In apparatus of the kind described, the combination with the cranking shaft having a clutch element for engaging a similar clutch element on an engine shaft, when said cranking shaft is thrown inwardly; means continuously tending to withdraw said cranking shaft from the engine shaft, and means augmenting said last named means to instantly thrust said cranking shaft back out of connection with the engine shaft upon a "kick back" of the engine, said augmenting means comprising a spiral gear and a thrust block cooperating with said gear, and means continuously tending to mesh said spiral gear and thrust block, said thrust block being moved out of mesh by said spiral gear during cranking.

3. In apparatus of the kind described, the combination with the cranking shaft having a clutch element for engaging a similar clutch element on an engine shaft, when said cranking shaft is thrown inwardly; means to thrust said cranking shaft outwardly the instant a "kick back" occurs, said means comprising a gear train set in motion by the crank of said cranking shaft and including a spiral gear, and a thrust block with provisions for moving said cranking shaft back out of engagement with the engine shaft, said thrust block having teeth to mesh with said spiral gear and adapted to be moved out of mesh therewith while cranking, and means for bringing said teeth into mesh at the instant a "kick back" occurs.

4. In apparatus of the character described, a support, a cranking shaft with clutch element for engaging a similar element on an engine shaft when said cranking shaft is moved into contact therewith, said cranking shaft being rotatably and longitudinally movable in said support, a countershaft journaled in bearings in said support, a gear train between said cranking shaft and said countershaft, a spiral gear on one of said shafts rotatable with it but fixed against movement along said shaft, a sliding block with teeth to mesh with said spiral gear, means holding said block against rotation while permitting it to slide in a direction parallel to the axis of said spiral gear, said block adapted to slide and unmesh from said spiral gear while cranking, means continuously tending to mesh said block with said spiral gear whereby when a "kick back" occurs instant meshing will take place, and provisions whereby, when said slide block is meshed with said spiral gear, it will be pulled by said spiral gear to cause motion to be imparted to said cranking shaft along its axis to disengage the same from the engine shaft.

5. In apparatus of the character described, a support, a cranking shaft with clutch element for engaging a similar element on an engine shaft when said cranking shaft is moved into contact therewith, said cranking shaft being rotatably and longitudinally movable in said support, a countershaft journaled in bearings in said support, a gear train between said cranking shaft and said countershaft, a spiral gear on one of said shafts rotatable with it but fixed against movement along said shaft, a sliding block on the other shaft with teeth to mesh with said spiral gear, means holding said block against rotation while permitting it to slide in a direction parallel to the axis of said spiral gear, said block adapted to slide and unmesh from said spiral gear while cranking, means continuously tending to mesh said block with said spiral gear whereby when a "kick back" occurs instant meshing will take place, and provisions whereby, when said slide block is meshed with said spiral gear, it will be pulled by said spiral gear to cause motion to be imparted to said cranking shaft along its axis to disengage the same from the engine shaft.

6. In apparatus of the kind described, the combination with the cranking shaft having a clutch element for engaging a similar clutch element on an engine shaft, when said cranking shaft is thrown inwardly; means to thrust said cranking shaft outwardly the instant a "kick back" occurs, said means comprising a gear train set in motion by the crank of said cranking shaft and including a spiral gear, and a thrust block with provisions for moving said cranking shaft back out of engagement with the engine shaft, said thrust block having teeth to mesh with said spiral gear and adapted to be moved out of mesh therewith while cranking, and means for bringing said teeth into mesh at the instant a "kick back" occurs, said thrust block having some lost motion for the purposes described.

LAWRENCE RUDOLPH.